(12) United States Patent
Zhao

(10) Patent No.: US 12,383,931 B1
(45) Date of Patent: Aug. 12, 2025

(54) PLANT POLLEN SIFTER DEVICE AND ITS ACCESSORIES

(71) Applicant: Ying Zhao, Hebei (CN)

(72) Inventor: Ying Zhao, Hebei (CN)

( * ) Notice: Subject to any disclaimer, the term of this patent is extended or adjusted under 35 U.S.C. 154(b) by 0 days.

(21) Appl. No.: 19/019,021

(22) Filed: Jan. 13, 2025

(51) Int. Cl.
*A01G 7/00* (2006.01)
*B07B 1/02* (2006.01)

(52) U.S. Cl.
CPC . *B07B 1/02* (2013.01); *A01G 7/00* (2013.01)

(58) Field of Classification Search
CPC ........................................ B07B 1/02
USPC ........................................ 209/352
See application file for complete search history.

(56) References Cited

U.S. PATENT DOCUMENTS

| | | | | |
|---|---|---|---|---|
| 5,517,947 A | * | 5/1996 | Christman | A01K 1/0114 209/373 |
| 5,598,811 A | * | 2/1997 | Merchant | A01K 1/0114 119/166 |
| 9,550,214 B2 | * | 1/2017 | Harpel | B07B 1/02 |
| 2004/0253032 A1 | * | 12/2004 | Kojima | B41J 13/103 400/101 |
| 2023/0249491 A1 | * | 8/2023 | Welper | B44D 3/14 211/65 |

FOREIGN PATENT DOCUMENTS

| CN | 205947531 U | * | 2/2017 | ........... A47D 1/0081 |
|---|---|---|---|---|
| CN | 219693727 U | * | 9/2023 | |
| CN | 116853128 A | * | 10/2023 | ............... B60R 7/06 |

* cited by examiner

*Primary Examiner* — Terrell H Matthews

(57) ABSTRACT

The embodiment of the application discloses Plant Pollen Sifter device, relating to the technical field of pollen sieving, comprising sieve tray, sieve tray comprises inner tray and outer tray, wherein inner tray is sleeved inside outer tray, a plurality of installation holes are opened at the top edge of inner tray, inner tray is connected with storage board through the installation holes, and one side of storage board is provided with a clamping plate rack adapted to the installation holes.

17 Claims, 15 Drawing Sheets

PLANT POLLEN SIFTER DEVICE AND ITS ACCESSORIES

TECHNICAL FIELD

The application relates to the technical field of pollen sorting and sieving, in particular to a plant pollen sifter device and its accessories.

BACKGROUND OF THE PRESENT INVENTION

In modern life, it is often necessary to screen various granular substances. For example, pollen production has a certain workflow, from collecting pollen raw materials, then drying them, then selecting impurities, sieving, and then completing disinfection, and then going through cell-wall breaking, mixing auxiliary materials, pelleting and secondary drying. In this series of production processes, a pollen sieving needs to be used to sieve the coarse residue and fine residue when pollen is screened, so that the fine residue falls into the aggregate box through the sieve holes to realize the separation between coarse residue and fine residue.

In the related arts, the applicant of the present application realizes that although some manual sieving devices can achieve the corresponding sieving purpose, the operator sometimes needs to temporarily place operating tools during the manual sieving process, for example, when pruning flowers, pollen, trichomes, etc., it needs to temporarily place operating tools such as scissors and gloves, or because of long and boring operations, the operator wants to place daily necessities such as mobile phones and water cups on the sieving device so as to concentrate and improve work efficiency. However, due to the structural limitations of the current sieving devices, there is no place on the sieving devices for placing some articles such as hand tools and mobile phones.

SUMMARY OF PRESENT INVENTION

The embodiment of the present application aims to provide a plant pollen sifter device in order to make up for the shortcomings of the prior art.

In order to achieve the above objectives, the present application provides the following technical solutions.

Plant Pollen Sifter Device includes sieve tray comprising inner tray and outer tray, inner tray being sleeved inside outer tray, and the top edge of inner tray covering the top edge of outer tray; A plurality of mounting holes are provided at the top edge of inner tray, inner tray is connected with storage board through mounting holes, a side of storage board close to sieve tray is further provided with a clamping plate adapted to mounting hole, storage board is inserted into mounting hole through clamping plate and clamped on inner tray, and an edge of the side of storage board close to sieve tray abuts against the top edge of inner tray. Wherein, by setting storage board, articles such as mobile phones can be placed on storage board at the same time of sieving work, thus solving the problem that there is no room to place articles such as tools or mobile phones during sieving work, and because the sieving work usually needs a long time, the setting of storage board can also make the user use mobile phones or watch videos or listen to music at the same time of sieving, so that the longer sifting time is not so boring.

Optionally, vertical opening groove is provided from the top of inner tray near the outer edge, horizontal opening groove penetrating into vertical opening groove is provided outwardly from the inner wall of inner tray near the inner edge of the top, and vertical opening groove is connected with the inside of the horizontal opening groove to form mounting hole;

Clamping plate includes: a vertical substrate portion protruding from the bottom edge of a side of storage board close to sieve tray and extending downward, and a transverse clamping portion formed by bending from a free end of the substrate portion in a direction outside the coverage range of a horizontal projection surface of storage board;

When clamping plate and mounting hole are in a clamping state, the lateral clamping portion of clamping plate is inserted into the horizontal opening groove and contacts the upper and lower groove walls of the horizontal opening groove, and the vertical base plate portion of clamping plate is provided in the vertical opening.

Optionally, clamping plate further includes limit baffle kit formed by folding upward from a free end of lateral clamping portion, and when clamping plate and mounting hole are in a clamping state, the limit baffle kit of clamping plate protrudes from horizontal opening groove toward an inner wall side of inner tray.

Optionally, the top outer edge of inner tray has an outer rounded corner, the bottom edge of the side of storage board close to sieve tray has graded sieve surface, the turning point of the graded sieve surface has an inner rounded corner, and when clamping plate and mounting hole are in a clamping state, graded sieve surface of storage board abuts against the top outer edge of inner tray, and the inner rounded corner of graded sieve surface is fitted to the outer rounded corner.

Optionally, the bottom of storage board is further connected with a detachable support frame, support frame includes two groups of support frames symmetrically arranged at the bottom of storage board, and one end of each group of support frames away from storage board is fixedly connected to the side part of outer tray.

Optionally, the front surface of sieve tray is a baffle having a high middle and low two ends formed by extending upward from the bottom, a row of mounting holes for connecting storage board is provided at the top edge of the back surface of inner tray, and the front surface of sieve tray is configured to contact the waist of the user when placed on the leg of the user for use. Generally, storage board is usually installed at a position directly facing the user, that is, the back of inner tray, such arrangement is convenient for the user to take and watch the audio-visual equipment on storage board while working with the sifter device.

Optionally, the top edges of the left and right sides of inner tray are respectively provided with a row of mounting holes for connecting storage board, wherein the size specifications of mounting holes on the left and right sides of inner tray are consistent with mounting holes at the top edge of the back surface of inner tray; So that storage board can also be installed at the left front or right front side positions of the user (that is, the two sides of inner tray) according to the needs, such a setting improves the use flexibility of storage board, and is convenient for the user to flexibly install storage board according to the actual needs.

Optionally, the number of clamping plates on the side of storage board is multiple.

Optionally, storage board is provided with a groove for installing support frame, and one end of support frame is provided with a clamping structure, and the clamping structure is embedded and clamped inside the groove.

Optionally, one side of outer tray is provided with a clamping slot structure, and fixture block is provided on one side of support frame far from storage board, and fixture block is embedded and installed inside the clamping slot structure.

Optionally, the bottom of inner tray is provided with installation opening, a screen is installed at installation opening, the screen is arranged for sieving pollen, the bottom of outer tray is sealed, a certain accommodation space is reserved between the inner bottom of outer tray and the outer bottom of inner tray, the sieved pollen falls into the reserved gap, and then the sieved pollen can be taken out by removing inner tray sleeved inside outer tray.

Optionally, the bottom of outer tray is sealed, and a certain accommodation space is reserved between the inner bottom of outer tray and the outer bottom of inner tray, and the size of the accommodation space is larger than 30 mm.

Optionally, two sides of outer tray are also provided with buckle grooves.

Optionally, the bottom of storage board is provided with a plurality of reinforcing rib plates.

Optionally, clamping plate width is 20-25 mm, the thickness is 5 mm-7 mm, the width of mounting hole is 22 mm-27 mm.

Optionally, the overall thickness of storage board is less than 20 mm so that storage board can be placed in the reserved gap between the inner bottom of outer tray and the outer bottom of inner tray.

Compared with the prior art, Plant Pollen Sifter Device has the following beneficial effects:

In the present application, a mounting hole for connecting storage board is provided on sieve tray, which can facilitate the installation of storage board, and the installation plate is installed through mounting hole, and articles such as mobile phones can be placed on storage board at the same time of sieving work, thus solving the problem that there is no place to place articles such as tools or mobile phones during sieving work. In addition, since the sieving work usually takes a long time, the setting of storage board can also enable the user to use a mobile phone or watch a video or listen to music while sieving, so that the longer screening time is less boring.

BRIEF DESCRIPTION OF THE DRAWINGS

In order to more clearly explain the technical solutions in the embodiments of the present application or the prior art, the drawings that need to be used in the description of the embodiments or the prior art will be briefly introduced below, and it is obvious that the drawings in the following description are only some embodiments of the present application, and for those skilled in the art, other drawings can be obtained from these drawings without making creative labor.

1. sieve tray; 101, inner tray; 1011, mounting opening; 1012, a sieve mesh; 1013, graded sieve surface; 102, outer tray; 1021, slot structure; 1022, buckle groove; 2, mounting hole; 3. storage board; 301, groove; 302, reinforcing rib plate; 4, clamping plate; 5, support frame; 501, fixture block; 502, snap-fit structure.

DETAILED DESCRIPTION OF THE EMBODIMENT'S

With reference to the drawings in the embodiments of the present application, the following provides a clear and complete description of the technical solutions in the embodiments of the present application. Obviously, the described embodiment is merely part of the embodiments of the present application and not all of them. Based on the embodiments in the present application, all other embodiments obtained by those skilled in the art without creative work fall within the scope of protection of the present application.

First Embodiment

Referring to FIGS. 1-12, the present application provides a plant pollen sifter device configured at least to prune flowers of a plant and implement a sieving operation of pollen so as to obtain separated pollen by sieving.

Figure 1:
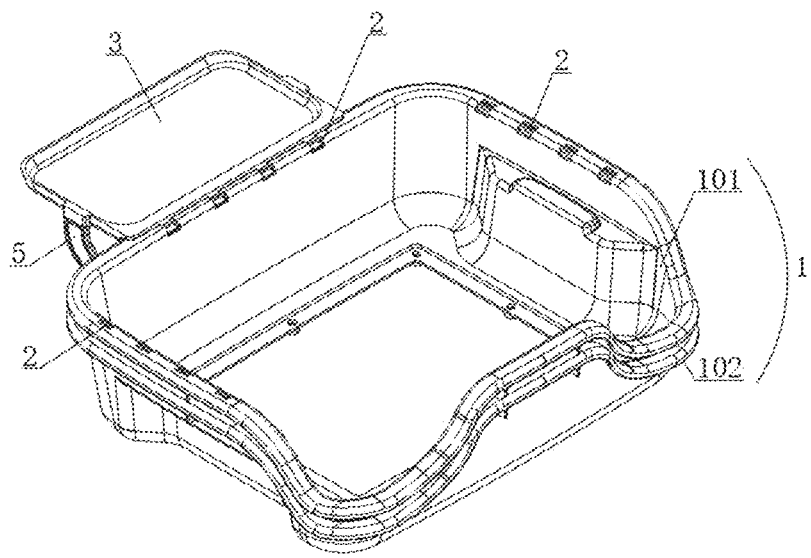
FIG. 1 is a schematic structural diagram of the first embodiment of the plant pollen sieving device according to the present application.
Figure 2:
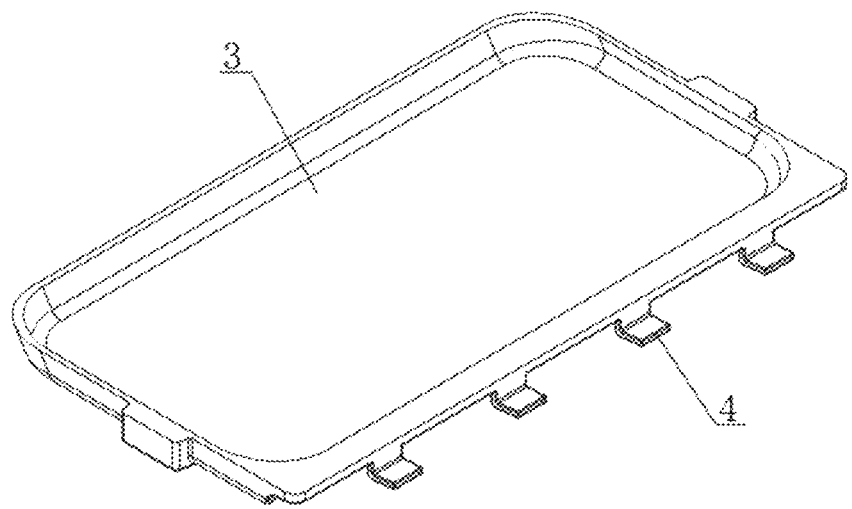
FIG. 2 is a structural diagram of one implementation of storage board in the present application.
Figure 3:
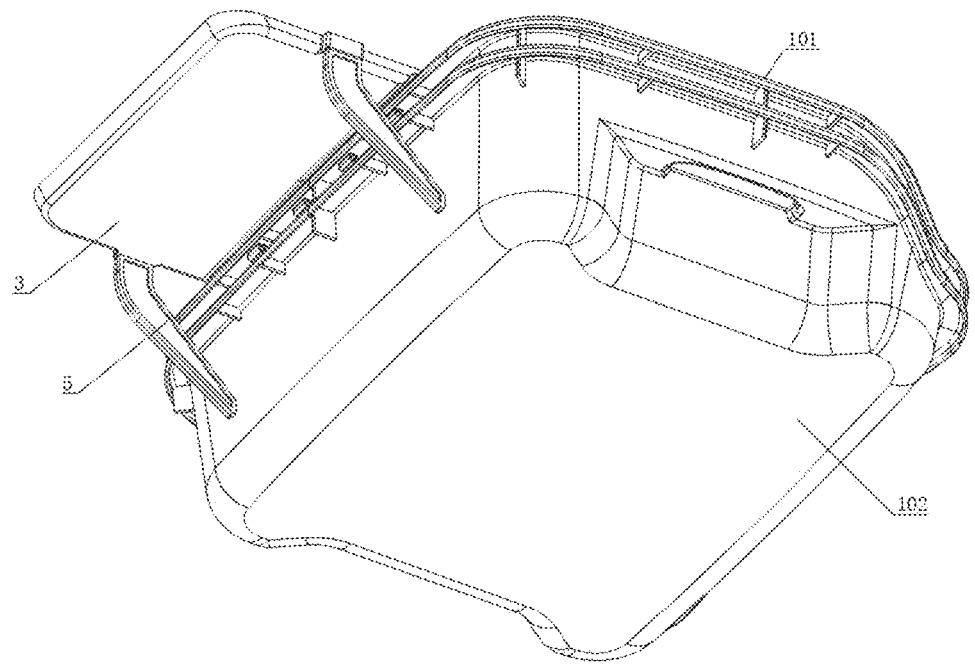
FIG. 3 is a schematic installation view of an embodiment of storage board in the present application.

Referring to FIG. 1, in some embodiments, the sieving device includes sieve tray 1, which comprises inner tray 101 and outer tray 102, where inner tray 101 is set inside outer tray 102 and the top edge of inner tray 101 covers the top edge of outer tray 102; multiple installation holes 2 are opened at the top edge of inner tray 101 and the spacing between the plurality of installation holes 2 can be set the same, which simplifies the manufacturing process.

Inner tray 101 is connected to storage board 3 via mounting holes 2, with storage board 3 suspended outside sieve tray 1. For instance, it is designed to hold tools or other items used for trimming plant stamens or pistils. Mounting holes 2 are configured to ensure storage board 3 remains secure when bearing items, thereby achieving a reliable connection.

Storage board 3 is equipped with a clamping plate 4 on the side closer to sieve tray 1, which is adapted to mounting holes 2. Storage board 3 is fitted onto inner tray 101 by inserting clamping plate 4 into mounting holes 2, with the edge of storage board 3 adjacent to sieve tray 1 abutting against the top edge of inner tray 101. This design enhances the reliability of storage board 3 being attached to sieve tray 1.

Figure 13:
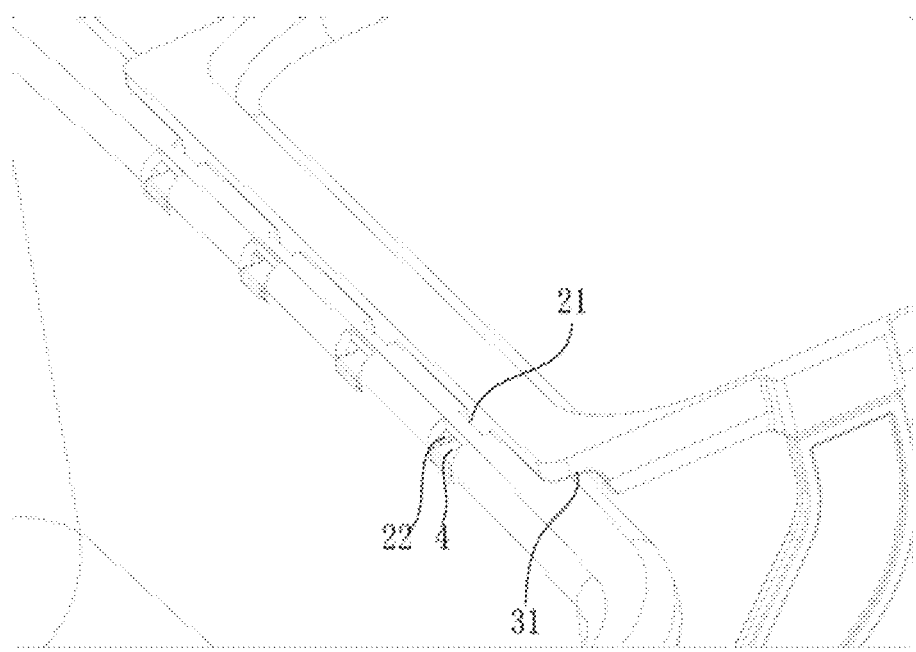
FIG. 13 is a schematic diagram of the connection structure of the connection between storage board and sieve tray of the present application.
Figure 14:
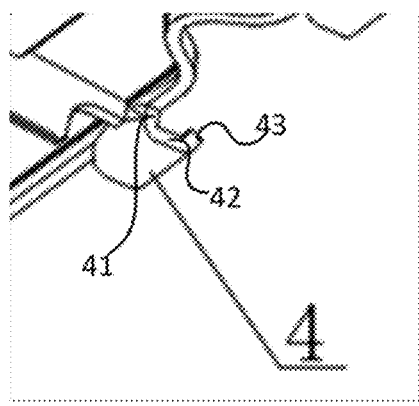
FIG. 14 is a partial schematic diagram of one embodiment of the display card structure of storage board of the present application.

Referring to FIGS. 13 and 14, in some embodiments, a vertical opening groove 21 is provided from the top of inner tray 101 near the outer edge, a horizontal opening groove 22 penetrating into the vertical opening groove 21 is provided outwardly from the inner wall of inner tray near the inner edge of the top, and the vertical opening groove 21 is connected with the inside of the horizontal opening groove 22 to form mounting hole;

Clamping plate can be made of a material with certain resilience, comprising: a vertical base plate part 41 which protrudes from the bottom edge of one side of the storage plate 3 and extends downward; a vertical base plate part 42 formed by bending from the free end of the base plate part towards the area outside the horizontal projection of storage board 3.

When clamping plate 4 is in a clamping state with mounting holes, the vertical base plate part 42 of clamping plate 4 is inserted into the horizontal open slot 22, contacting the upper and lower slot walls of the horizontal open slot 22, and the vertical base plate part 41 of clamping plate 4 is positioned within the vertical opening.

Referring to FIG. 14, in particular, clamping plate 4 further includes a limit baffle kit 43 formed by folding upward from a free end of the lateral clamping portion 42, and when clamping plate 4 and mounting hole are in a clamping state, the limit baffle kit 43 of clamping plate 4 protrudes from the horizontal opening groove 22 toward an inner wall side of inner tray 101. During installation, storage board 3 is first tilted towards sieve tray side at a certain angle. The limit baffle kit 43 of clamping plate is then inserted downward along the vertical opening groove 21 to the bottom. Subsequently, it is rotated slowly away from sieve tray 1, allowing a part of the lateral clamping portion 42 of clamping plate 4 to enter the horizontal slot. While flattening storage board 3, it is pushed forward gradually until the limit baffle kit 43 protrudes from the horizontal slot. This arrangement ensures that, when subjected to vibration or when the complete sifter device is inverted, the inner top edge of the limit baffle kit will come into interference with the opening face of the horizontal slot, preventing clamping plate from unintentionally disengaging from the installation hole towards the far side of sieve tray. This enhances the reliability of the latching installation, reducing the risk of storage board's clamping plate accidentally disengaging from the installation hole.

It is understandable that in order to facilitate the installation and removal of clamping plate, the entire clamping plate may be made of a material having a slight resilience, ABS, PP, PC, PET and other plastics, it can also be made of spring steel, aluminum alloy and other materials.

In some embodiments, when clamping plate 4 is inserted into mounting hole, lateral clamping portion 42 of clamping plate 4 is locked with the upper and lower groove walls of the horizontal open groove in mounting hole, and the width of clamping plate is generally 20-25 mm, the thickness is 5 mm-7 mm, the width of mounting hole is 22 mm-27 mm, clamping plate 4, similarly, the spacing between the plurality of clamping plates is also adapted to be the same, and is similar to that of mounting hole 2, so that clamping plate 4 can be conveniently inserted into the interior of mounting hole 2.

Referring to FIG. 13 inner tray 101 is provided with an outer rounded corner on its top outer edge, and the bottom edge of the side of storage board close to sieve tray is provided with a graded sieve surface 31. When clamping plate 4 and mounting hole 2 are in the clamping state, graded sieve surface 31 of the storage plate 3 is pressed against the top outer edge of inner tray 101, and the internal rounding corner of graded sieve surface 31 is fitted with the outer rounding corner.

In certain embodiments, the underside of storage board 3 is further connected with a detachable support frame 5, which comprises two sets of support frames symmetrically arranged beneath storage board. The end of each support frame 5, away from storage board, is fixedly connected to the side of outer tray 102. In other words, the end opposite storage board 3 abuts against the side of outer tray 102, with one end of support frame 5 in contact with storage board 3 and the other end in contact with sieve tray 1, enhancing clamping stability and allowing storage board 3 to be easily detached, facilitating storage and convenient repositioning or replacement.

In this embodiment, the installation of storage board 3 on sieve tray 1 aims to enable the placement of items such as phones on storage board 3 during sifting, resolving the issue of having nowhere to place gloves, scissors, phones, etc., while sifting. Additionally, given that sifting often requires a considerable amount of time, the presence of storage board 3 allows users to use their phones, watch videos, or listen to music while sifting, making the prolonged process less monotonous.

In some embodiments, the front of sieve tray 1 of the device is in the shape of a baffle plate that extends from the bottom upwards to form a middle high and low end.

Simultaneously, to facilitate flexible use as needed, in certain embodiments, a row of mounting holes 2 for connecting storage board may be arranged along the top edge of the back side of inner tray 101. Sieve tray 1 is configured to be placed on the user's lap during use, with its front side in contact with the user's waist. Along the top edge of the back side of inner tray 101, a row of mounting holes 2 for connecting storage board is provided. When storage board 3 is installed here, it is positioned directly in front of the user, allowing the user to conveniently lower their head to view the mobile phone on storage board 3.

In certain embodiments, a row of installation holes 2 for connecting storage board may also be individually provided at the top edges of both left and right sides of inner tray 101. The dimensions of these installation holes 2 on the left and right sides of inner tray 101 are consistent with those on the top edge of the backside of inner tray 101. This setup allows storage board 3 to be easily placed on either the left or right side of inner tray 101, thereby facilitating flexible usage by the user and enhancing the overall flexibility of the device.

In certain embodiments, storage board 3 of the present application features multiple clamping plate 4 on one side, with clamping plates 4 configured in an L-shape. These L-shaped clamping plates are embedded within mounting holes 2. As illustrated, preferably, there are four such clamping plates 4, corresponding to the four mounting holes on each side. This configuration allows for a secure fixation of storage board 3. Storage board 3 is also provided with groove 301 for the installation of support frames 5. One end of support frame 5 is equipped with a snap-fit structure 502, which is inserted into and locked within groove 301. This design enables support frame 5 to be securely connected to storage board 3, while also facilitating easy disassembly, thereby enhancing the operational flexibility of the device.

Figure 8:
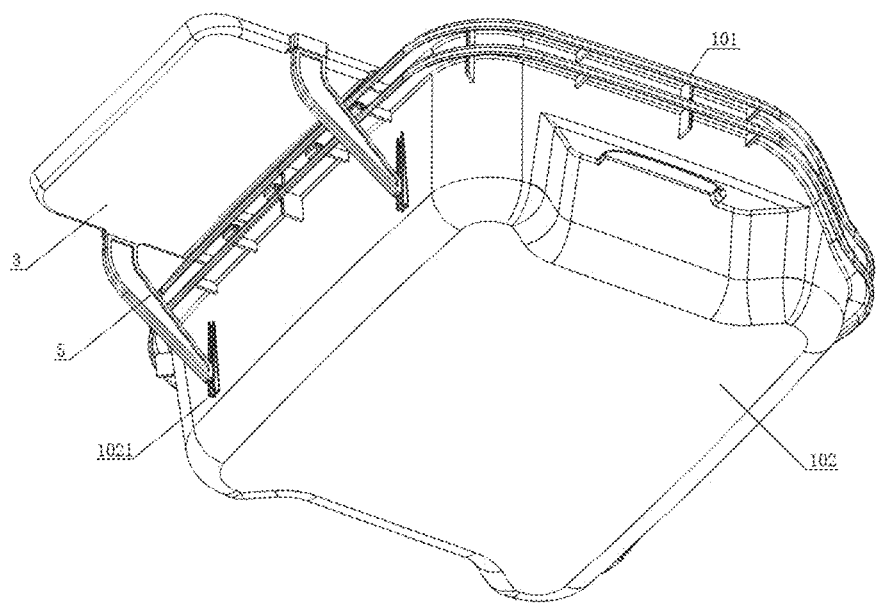
FIG. 8 is a schematic structural diagram of an embodiment of the slot structure according to an embodiment of the present application.
Figure 9:
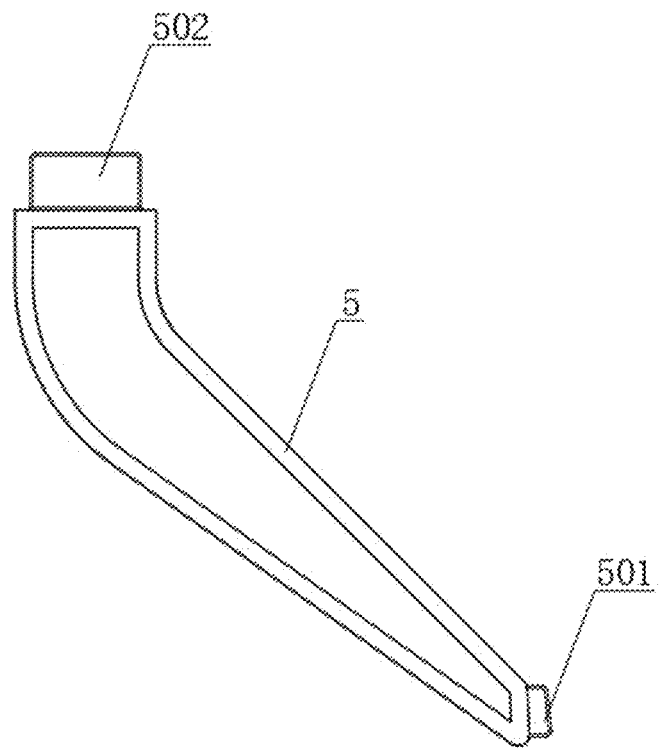
FIG. 9 is a schematic structural diagram of support frame according to another embodiment of the present application.

Additionally, referring primarily to FIGS. 8 and 9, a slot structure 1021 is provided on one side of outer tray 102, while fixture block 501 is positioned on the side of support frame 5 away from storage board 3. Fixture block 501 is installed within the slot structure 1021 and can slide within it. The inclusion of the slot structure 1021 ensures that one end of fixture block 501 on support frame 5 can be securely pressed against the outer wall of outer tray 102, preventing lateral movement and thereby significantly enhancing the support stability of support frame 5.

The underside of inner tray 101 is equipped with a installation opening 1011, which features a threaded mounting hole. Sieve mesh 1012 is mounted at installation opening 1011, secured by a fastening bolt that passes through the sieve mesh 1012. This design allows the sieve mesh 1012 to be conveniently installed and removed from installation opening 1011. The detachable configuration of the sieve mesh 1012 facilitates its replacement and maintenance, enhancing the flexibility of the device's use. The sieve mesh 1012 is specifically designed for filtering pollen. The underside of outer tray 102 is sealed, and a reserved space is left between the interior bottom of outer tray 102 and the exterior bottom of inner tray 101. The pollen sifted through falls into this reserved space and can be retrieved by removing inner tray that is seated inside outer tray. The entire thickness of the mounting panel is less than 20 mm, allowing it to be placed within the reserved space between the interior bottom of outer tray and the exterior bottom of inner tray.

Figure 12:
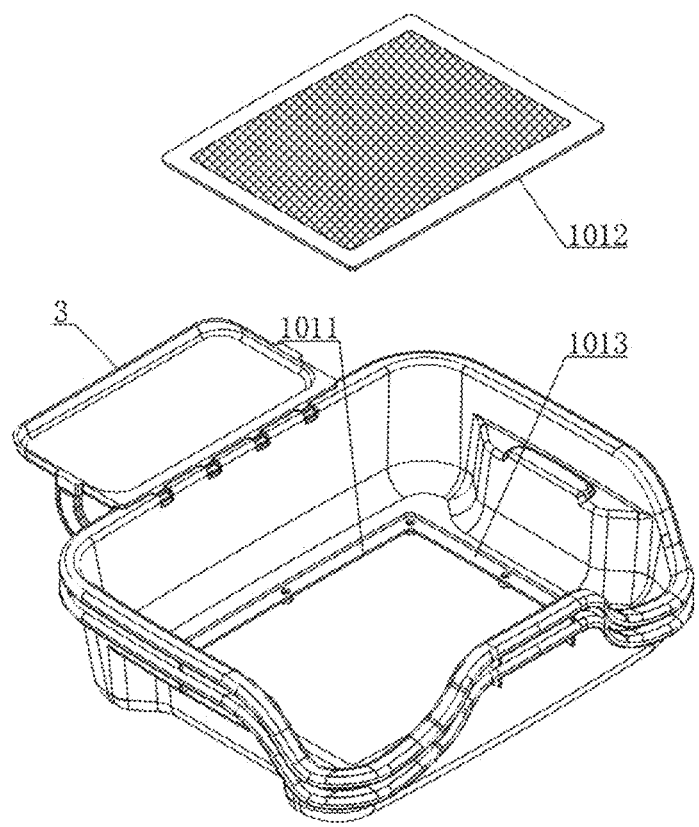
FIG. 12 is a schematic structural diagram of one embodiment of sieve of mesh according to one embodiment of the present application.

In some embodiments, the sieve mesh 1012 may also be mounted in other detachable manners at installation opening 1011, for example, as illustrated in FIG. 12, by providing a graded sieve surface 1013 at installation opening, where the periphery of the screen is placed on graded sieve surface, thereby achieving the reliable installation of the sieve mesh 1012. Specifically, a ferromagnetic layer is arranged around the periphery of the sieve mesh, and a magnetic layer is provided on graded sieve surface 1013 to facilitate the installation and positioning of the sieve mesh. Moreover, when the sieve mesh is placed on the graded sieve surface, they can be securely magnetically adhered to each other, ensuring reliable installation of the sieve mesh.

Specifically, the sieve mesh 1012 is employed to sieve pollen, while the base of outer tray 102 is sealed. A reserved accommodation space is provided between the inner bottom of outer tray 102 and the outer bottom of inner tray 101. Poured pollen falls into this reserved space and can be retrieved by removing inner tray 101 that is set within outer tray 102.

In one embodiment, the sieve holes of sieve mesh 1012 can be circular, elliptical, diamond-shaped, or of irregular geometric forms. The sieve mesh 1012 can be made from rigid and lightweight materials, such as aluminum alloys, PTFE, wooden planks, acrylics (PMMA or Plexiglas).

Figure 4:
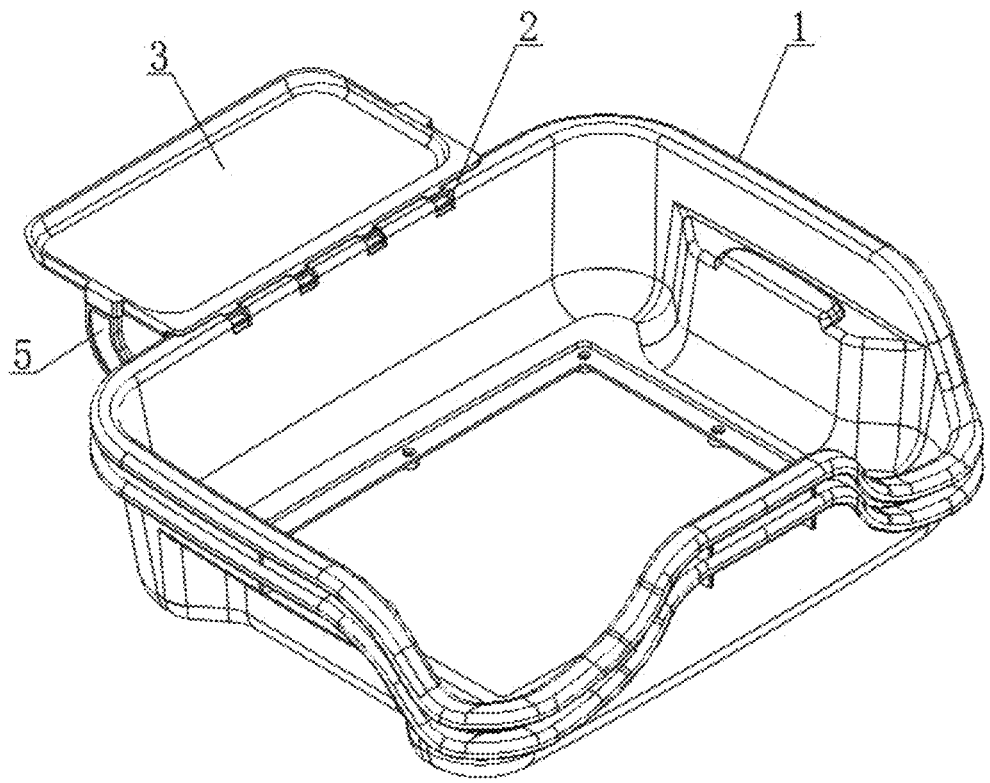
FIG. 4 is a structural schematic diagram of one embodiment of storage board in the present application.
Figure 5:
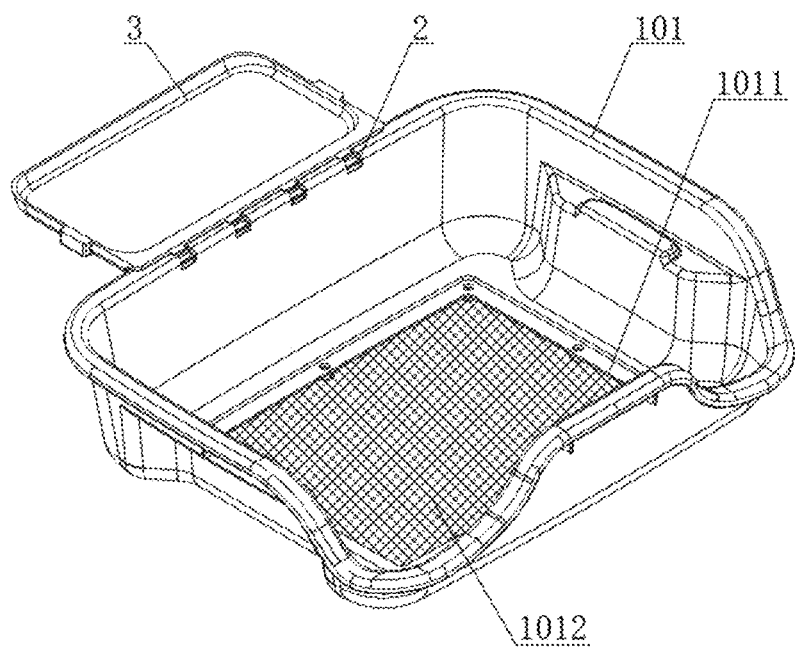
FIG. 5 is a schematic diagram of inner tray according to an embodiment of the present application.
Figure 11:
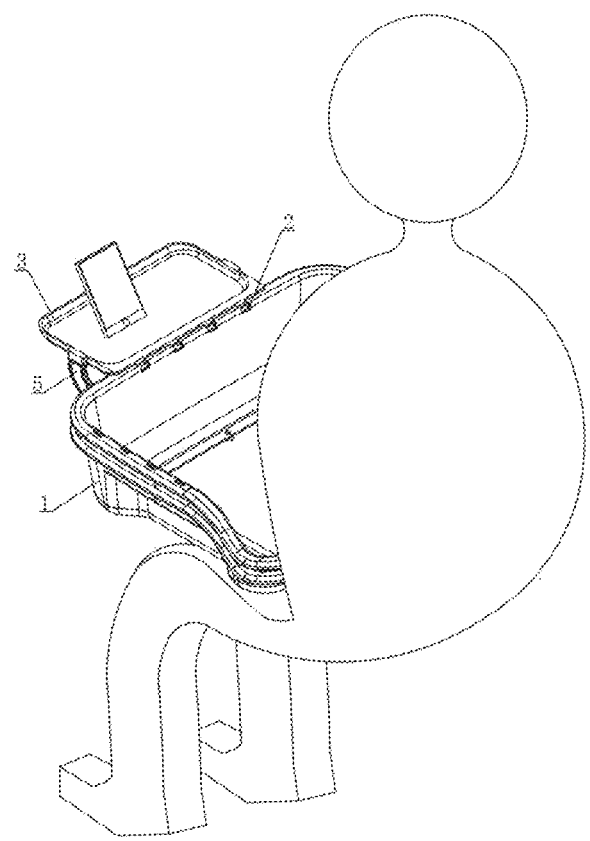
FIG. 11 is a schematic diagram of a usage scenario of Plant Pollen Sifter Device according to one embodiment of the present application.

Please refer primarily to FIGS. 4 and 11. The operational state of the device is illustrated in FIG. 11. Sieve tray 1 is placed on the user's lap, with its front face in contact with the user's waist. A series of mounting holes 2 are provided on the back of inner tray 101 for connecting storage board 3. Storage board 3 is often installed in a position directly facing the user (i.e., on the back of inner tray 101). This arrangement facilitates the user's access and visibility of the mobile phone placed on storage board 3.

Figure 6:
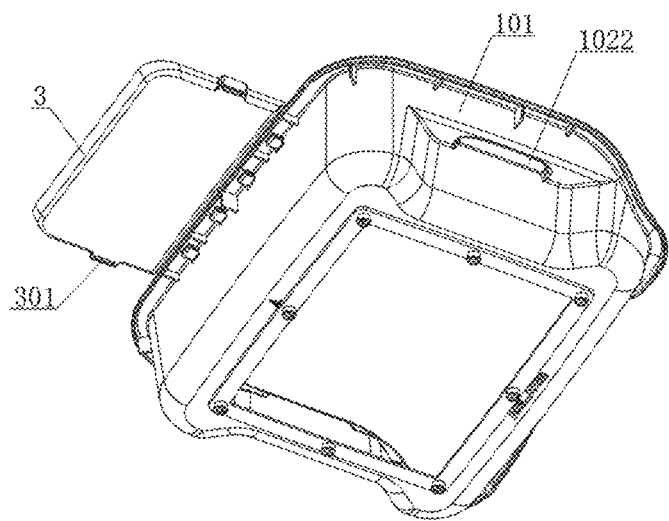
FIG. 6 is a structural diagram of one implementation of the buckle groove according to an embodiment of the present application.
Figure 7:
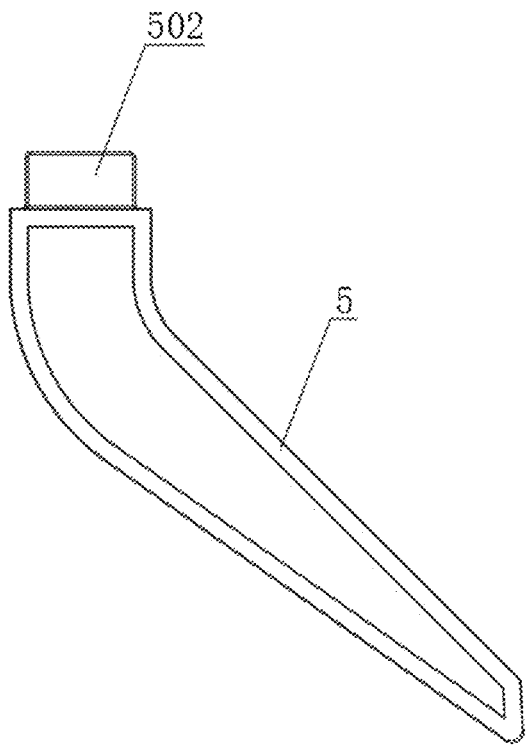
FIG. 7 is a structural diagram of one implementation of storage board according to an embodiment of the present application.

Please focus on FIGS. 1 and 6, where installation holes 2 for connecting storage board 3 are arranged on both sides of inner tray 101, enabling storage board 3 to be installed at positions near the front left or right sides of the user (i.e., on both sides of inner tray 101). This arrangement enhances the flexibility of storage board 3, allowing users to adaptively install it based on their needs and further improving the practicality of the device. Both sides of inner tray 101 and outer tray 102 are equipped with buckle groove 1022, facilitating the handling, moving, or disassembly of trays by staff.

Figure 10:
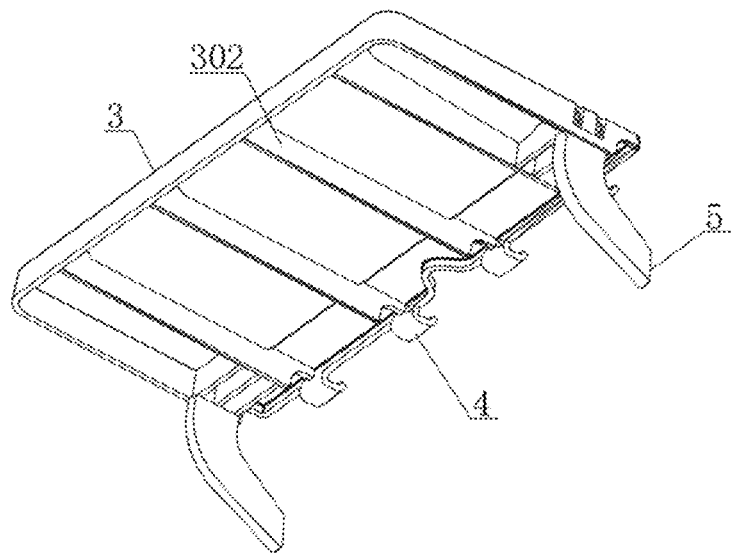
FIG. 10 is a schematic structural diagram of one embodiment of the reinforcing rib plate according to an embodiment of the present application.

Please focus on FIG. 10. The underside of storage board 3 is equipped with multiple reinforcing rib plates 302; the incorporation of these rib plates enhances the structural strength of storage board 3, thereby improving the practicality of the device.

As an application example, in the context of pollen screening, after harvesting the flowers, the operator first installs two support frames onto storage board 3, then slots storage board into the plant sieve tray. The purpose of this setup is to accommodate items like mobile phones on the board during the screening process, effectively resolving the issue of where to place gloves, scissors, and phones while screening. Considering that pollen screening often requires extended periods, this design also allows the user to trim and check their phone simultaneously, making the longer duration of the screening process less monotonous.

Second Embodiment

Figure 15:
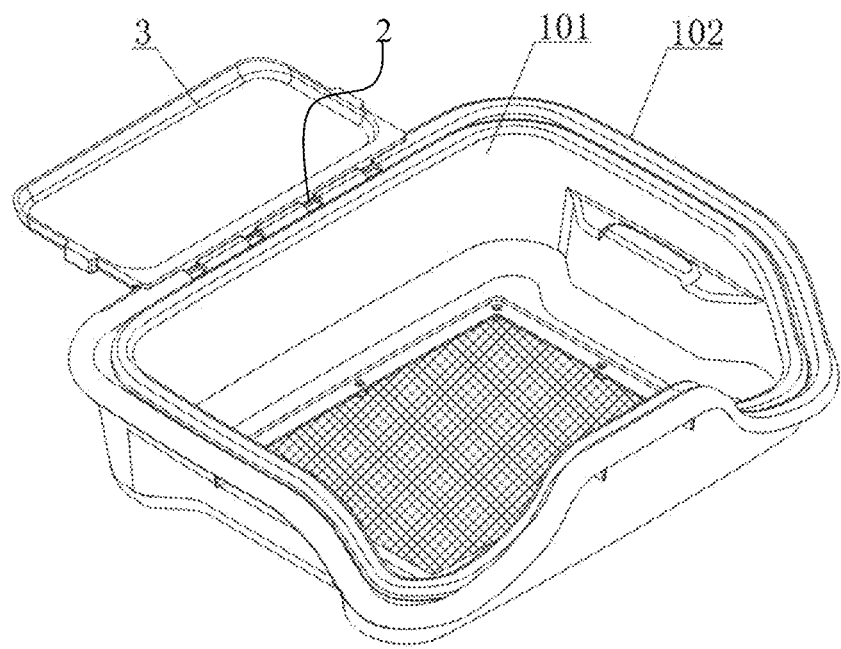
FIG. 15 is a schematic structural diagram of a second embodiment of the plant pollen sifter device according to the present application.

Referring to FIGS. 14 and 15, there is illustrated a pollen sifter device for plants, which comprises sieve tray. Sieve tray includes inner tray 101 and outer tray 102, wherein inner tray 101 is fitted within outer tray 102. Along the top edge of outer tray 102, multiple mounting holes 2 are provided. Outer tray 102 is connected to storage board 3 via mounting holes 2. The side of storage board 3 near sieve tray is equipped with a clamping plate that matches installation holes 2, allowing storage board 3 to be fixed to outer tray 102 by inserting clamping plate into the installation holes 2. The edge of storage board 3 near sieve tray abuts against the top edge of outer tray 102.

In some embodiments, the top edge of inner tray 101 is substantially aligned with the inner edge of the top of outer tray 102.

In certain embodiments, a portion of the outer edge of the top of inner tray 101 is situated over and seats on the inner edge of the top of outer tray 102, and a part of the outer edge of outer tray 102 remains exposed, with mounting holes 2 being located on the exposed portion of the outer edge of outer tray 102.

In some embodiments, the top edge of inner tray 101 is positioned lower than the inner top edge of outer tray 102.

In summary, in the present application, a mounting hole for connecting storage board is provided on sieve tray, which can facilitate the installation of storage board, and the installation plate is installed through mounting hole, and articles such as mobile phones can be placed on storage board at the same time of sieving work, thus solving the problem that there is no place to place articles such as tools or mobile phones during sieving work. In addition, since the sieving work usually takes a long time, the setting of storage board can also enable user to use a mobile phone or watch a video or listen to music while sieving, so that the longer screening time is less boring.

It should be noted that, herein, relational terms such as first and second are used merely to distinguish one entity or operation from another entity or operation, and do not necessarily require or imply that any such actual relationship or order exists between the entities or operations. Furthermore, the terms "comprising", "including" or any other variation thereof are intended to encompass a non-exclusive inclusion such that a process, method, article, or apparatus comprising a series of elements includes not only those elements, but also other elements not explicitly listed, or elements inherent to such a process, method, article, or apparatus.

Although embodiments of the present application have been shown and described, it will be understood by those of ordinary skill in the art that various changes, modifications, substitutions, and variations can be made to these embodiments without departing from the principles and spirit of the present application, the scope of which is defined by the appended claims and their equivalents.

What is claimed is:

1. Plant Pollen Sifter Device includes sieve tray comprising inner tray and outer tray, inner tray being sleeved inside outer tray, and the top edge of inner tray covering the top edge of outer tray;

and it is characterized in that a plurality of mounting holes are provided at the top edge of inner tray, inner tray is connected with storage board through mounting holes, the side of storage board close to sieve tray is also provided with a clamping plate adapted to mounting hole, storage board is inserted into mounting hole through clamping plate and clamped on inner tray, and the edge of the side of storage board close to sieve tray abuts against the top edge of inner tray;

a vertical opening groove is provided from the top of inner tray near the outer edge, a horizontal opening groove penetrating into the vertical opening groove is provided outwardly from the inner wall of inner tray near the inner edge of the top, and the vertical opening groove is connected with the inside of the horizontal opening groove to form mounting hole.

2. According to the claim 1, Plant Pollen Sifter Device is characterized in that Clamping plate includes: a vertical substrate portion protruding from a bottom edge of a side of storage board close to sieve tray and extending downward, and a transverse clamping portion formed by bending from a free end of the substrate portion in a direction outside the coverage range of a horizontal projection surface of storage board;

When clamping plate and mounting hole are in a clamping state, the lateral clamping portion of clamping plate is inserted into the horizontal opening groove and contacts the upper and lower groove walls of the horizontal opening groove, and the vertical base plate portion of clamping plate is provided in the vertical opening.

3. According to claim 2, Plant Pollen Sifter Device is characterized in that clamping plate further includes a limit baffle kit formed by folding upward from a free end of the lateral clamping portion, and when clamping plate and mounting hole are in a clamping state, the limit baffle kit of clamping plate protrudes from the horizontal opening groove toward an inner wall side of inner tray.

4. According to claim 1, Plant Pollen Sifter Device is characterized in that the top outer edge of inner tray has an outer rounded corner, the bottom edge of the side of storage board close to sieve tray has a graded sieve surface, the turning point of the graded sieve surface has an inner rounded corner, and when clamping plate and mounting hole are in a clamping state, the graded sieve surface of storage board abuts against the top outer edge of inner tray, and the inner rounded corner of graded sieve surface is fitted to the outer rounded corner.

5. According to claim 1, Plant Pollen Sifter Device is characterized in that the bottom of storage board is further connected with a detachable support frame, support frame includes two groups of support frames symmetrically arranged at the bottom of storage board, and one end of each group of support frames away from storage board is fixedly connected to the side part of outer tray.

6. According to claim 1, Plant Pollen Sifter Device is characterized in that the front surface of sieve tray is a baffle having a high middle and low two ends formed by extending upward from the bottom, a row of mounting holes for connecting storage board is provided at the top edge of the back surface of inner tray, and the front surface of sieve tray is configured to contact the waist of the user when placed on the leg of the user for use.

7. According to claim 6, Plant Pollen Sifter Device is characterized in that the top edges of the left and right sides of inner tray are respectively provided with a row of mounting holes for connecting storage board, wherein the size specifications of mounting holes on the left and right sides of inner tray are consistent with mounting holes at the top edge of the back surface of inner tray.

8. According to claim 1, Plant Pollen Sifter Device is characterized in that there are a plurality of clamping plates on one side of storage board.

9. According to claim 1, Plant Pollen Sifter Device is characterized in that storage board is provided with a groove for installing support frame, and one end of support frame is provided with a clamping structure, and the clamping structure is embedded and clamped inside the groove.

10. According to claim 5, Plant Pollen Sifter Device is characterized in that one side of outer tray is provided with a clamping slot structure, and fixture block is provided on one side of support frame far from storage board, and fixture block is embedded and installed inside the clamping slot structure.

11. According to claim 1, Plant Pollen Sifter Device is characterized in that the bottom of inner tray is provided with installation opening, and a sieve mesh is installed at installation opening.

12. According to claim 1, Plant Pollen Sifter Device is characterized in that the bottom of outer tray is sealed, and a certain accommodation space is reserved between the inner bottom of outer tray and the outer bottom of inner tray, and the size of the accommodation space is larger than 30 mm.

13. According to claim 1, Plant Pollen Sifter Device is characterized in that the two sides of outer tray are also provided with buckle grooves.

14. According to claim 1, Plant Pollen Sifter Device is characterized in that the bottom of storage board is provided with a plurality of reinforcing rib plates.

15. According to claim 1, Plant Pollen Sifter Device is characterized in that clamping plate width is 20-25 mm, the thickness is 5 mm-7 mm, the width of mounting hole is 22 mm-27 mm.

16. According to claim 1, Plant Pollen Sifter Device is characterized in that the overall thickness of storage board is less than 20 mm so that storage board can be placed in the reserved gap between the inner bottom of outer tray and the outer bottom of inner tray.

17. Plant Pollen Sifter Device includes sieve tray comprising inner tray and outer tray, inner tray being sleeved inside outer tray, and the top edge of inner tray covering the top edge of outer tray;

and it is characterized in that a plurality of mounting holes are provided at the top edge of outer tray, outer tray is connected with storage board through mounting holes, the side of storage board close to sieve tray is also provided with a clamping plate adapted to mounting hole, storage board is inserted into mounting hole through clamping plate and clamped on outer tray, and the edge of the side of storage board close to sieve tray abuts against the top edge of outer tray;

a portion of outer edge of the top of inner tray is situated over and seats on the inner edge of the top of outer tray, and a part of the outer edge of outer tray remains exposed, with mounting holes being located on the exposed portion of the outer edge of outer tray.

\* \* \* \* \*